United States Patent
Gooden et al.

(10) Patent No.: US 8,205,709 B2
(45) Date of Patent: Jun. 26, 2012

(54) TRANSMISSION FLUID WARMING AND COOLING SYSTEM

(75) Inventors: James Thomas Gooden, Canton, MI (US); Hamish Macwillson, Colchester (GB); Dragos Catalin Iliescu, Chelmsford (GB)

(73) Assignee: Ford Global Technologies, LLC., Dearborn, MI (US)

( * ) Notice: Subject to any disclaimer, the term of this patent is extended or adjusted under 35 U.S.C. 154(b) by 69 days.

(21) Appl. No.: 12/785,066

(22) Filed: May 21, 2010

(65) Prior Publication Data

US 2011/0284309 A1 Nov. 24, 2011

(51) Int. Cl.
- *F01P 11/08* (2006.01)
- *F16H 57/04* (2010.01)
- *F16H 59/78* (2006.01)
- *B60K 11/02* (2006.01)

(52) U.S. Cl. .................. 180/339; 123/41.31; 123/41.33; 475/161; 477/98

(58) Field of Classification Search .................. 180/339; 123/41.31, 41.33, 196 AB; 165/298, 299, 165/916; 477/98; 475/161
See application file for complete search history.

(56) References Cited

U.S. PATENT DOCUMENTS

| | | | |
|---|---|---|---|
| 3,752,222 A | 8/1973 | Olbermann, Jr. | |
| 4,680,928 A | 7/1987 | Nishikawa et al. | |
| 5,638,774 A | 6/1997 | Albertson et al. | |
| 5,992,515 A | 11/1999 | Spiegel | |
| 6,012,550 A | 1/2000 | Lee | |
| 6,196,168 B1 | 3/2001 | Eckerskorn et al. | |
| 6,427,640 B1 | 8/2002 | Hickey et al. | |
| 6,530,347 B2 * | 3/2003 | Takahashi et al. | 123/41.1 |
| 6,830,527 B2 * | 12/2004 | Wakayama | 475/161 |
| 7,073,467 B2 * | 7/2006 | Kanno et al. | 123/41.33 |
| 7,182,049 B2 * | 2/2007 | Wikstrom | 123/41.31 |
| 7,210,522 B2 * | 5/2007 | Gruian | 165/202 |
| 7,267,084 B2 | 9/2007 | Lütze et al. | |
| 7,594,483 B2 * | 9/2009 | Tsuji et al. | 123/41.1 |
| 2003/0116105 A1 * | 6/2003 | Pfeffinger et al. | 123/41.31 |
| 2003/0216211 A1 * | 11/2003 | Miyazaki et al. | 475/276 |
| 2006/0060346 A1 * | 3/2006 | Sasaki | 165/297 |
| 2007/0295475 A1 * | 12/2007 | Samie et al. | 165/41 |
| 2009/0101312 A1 | 4/2009 | Gooden et al. | |

FOREIGN PATENT DOCUMENTS

FR 2890430 A1 * 3/2007

OTHER PUBLICATIONS

Machine Translation FR 2890430 A1.*

(Continued)

*Primary Examiner* — Joseph Rocca
(74) *Attorney, Agent, or Firm* — Diederiks & Whitelaw PLC

(57) ABSTRACT

A system for heating and cooling the transmission fluid including a heat exchanger adapted to transfer heat between an engine coolant and a transmission fluid and a controller for controlling a valve to place the system into a select one of three modes including a heater core priority mode wherein no engine coolant flows to the heat exchanger, a heating mode wherein hot engine coolant flows directly to the heat exchanger from the engine and a cooling mode wherein cool engine coolant flows directly to the heat exchanger from the radiator, whereby the transmission fluid is heated in an efficient manner with minimal impact on passenger compartment heating.

25 Claims, 17 Drawing Sheets

OTHER PUBLICATIONS

Semel, "Fuel Economy Improvements Through Improved Automatic Transmission Warm-Up—Stand Alone Oil to Air (OTA) Transmission Cooling Strategy with Thermostatic Cold Flow Bypass Valve", SAE International, 2001-01-1760, May, 2001.

Semel, "Improved Automatic Transmission Warmup—Stand Alone Oil to Air (OTA) Transmission Cooling Strategy with Thermostatic Cold Flow Bypass Valve", SAE International, 2000-01-0963, Mar. 2000.

* cited by examiner

TRANSMISSION FLUID WARMING AND COOLING SYSTEM

FIELD OF THE INVENTION

The present invention pertains to the art of reducing parasitic losses in transmissions by warming up transmission fluid present in the transmission in a rapid and efficient manner thereby reducing the transmission fluid's viscosity and cooling the transmission fluid when the transmission is subject to heavy loads.

BACKGROUND OF INVENTION

Motor vehicles are typically used to transport people from place to place. As such they often have a passenger compartment and a power source, such as an engine that drives an automatic transmission which transmits energy from the power source to a set of driven wheels to propel the vehicle. Making such motor vehicles more efficient is currently a main focus of the automobile industry. Unfortunately, most automatic transmissions typically suffer from parasitic losses on startup of the power source. Such losses are particularly acute in the presence of low ambient temperatures, such as those present in a cold start in winter or a cold start in geographic areas having cold climates. Since the automatic transmission fluid present in the transmission has a viscosity that changes based on temperature, in cold temperature the viscosity may be quite high, thereby causing unacceptable parasitic losses and reduced fuel economy at least until the power source warms up the transmission and the automatic transmission fluid. Another problem associated with controlling the temperature of automatic transmission fluid is overheating. When a motor vehicle is subject to heavy use, for example, when the motor vehicle is towing a heavy load, the automatic transmission fluid is often heated too quickly and may overcome inherent cooling present in the transmission and additional cooling systems must be employed.

Also, in order to cool the engine, motor vehicles are typically provided with a cooling system that circulates a liquid coolant through the engine which heats the coolant and cools the engine. The coolant then flows through a heat exchanger or radiator to remove heat from the coolant. The coolant leaving the engine is often used as a heat source for auxiliary tasks. For example, the hot coolant leaving the engine may be sent though a heater core designed to transfer heat from the coolant to air. The hot air is then used to heat the passenger compartment.

To address the problem of reduced fuel economy caused by the transmission fluid being too cold soon after engine start, many motor vehicle manufacturers are pursuing technologies that will help the automatic transmission fluid heat up more quickly. One solution has been to use an oil-to-engine coolant heat exchanger to warm the automatic transmission fluid. However, in past arrangements, additional cooling has been required and therefore the arrangements have not been cost effective. Also, such arrangements have adversely affected passenger compartment heating and even adversely affected coolant flow through associated radiators. Passenger compartment heating can be compromised if too much heat is diverted to heating the automatic transmission fluid and, in the case of a two part radiator with a low temperature loop and a high temperature loop, additional efforts are needed to ensure that engine coolant is always flowing through the low temperature loop when coolant is flowing through the high temperature loop to avoid damage to the radiator.

Another solution is represented by the arrangement shown in U.S. Pat. No. 6,196,168. More specifically, a system is disclosed for preheating transmission fluid wherein part of the engine coolant is quickly heated by an internal combustion engine 17 and made available for heating of the transmission fluid as shown in FIG. 2. Coolant flows through an equalization tank 2 and then through an oil/water heat exchanger 5 but does not flow through radiator 4, 14. However, such an arrangement still suffers from several drawbacks. For example, the arrangement employs an excessive number of parts, which form a complex system that is slow to respond to changes in temperature. Another attempt to preheat transmission fluid is represented by U.S. Pat. No. 7,267,084. As shown in FIG. 2, engine coolant is sent through heat exchanger/oil cooler 24 to heat transmission fluid, however the system is not designed to send only hot or cold coolant to heat exchanger/oil cooler 24 the but rather sends a mixture of the hot and cold coolant. Furthermore, in order to function properly, the arrangement in FIG. 2 requires a relatively large number of control valves and heat exchangers yielding a relatively complicated and expensive system.

Based on the above, there exists a need in the art for a system for heating and cooling automatic transmission fluid in a rapid and efficient manner thereby reducing the viscosity of the transmission fluid and for cooling the transmission fluid when the transmission is subject to heavy loads, while overcoming some or all of the above-mentioned shortcomings of the prior art.

SUMMARY OF THE INVENTION

The present invention is directed to a vehicle with a passenger compartment and an internal combustion engine connected to an automatic transmission using transmission fluid that transmits power from the engine to a driven set of wheels to propel the vehicle. The vehicle also includes a system for heating and cooling the transmission fluid. The system includes a heat exchanger fluidly connected to the engine and transmission. The heat exchanger is adapted to receive hot engine coolant from the engine and to transfer energy from the hot engine coolant to the transmission fluid, which is subsequently sent back to the transmission. A passenger compartment heater core is fluidly connected to the engine and the passenger compartment. The heater core is adapted to receive hot engine coolant from the engine and to transfer energy from the hot engine coolant to air, which is sent to the passenger compartment in order to regulate the temperature of the passenger compartment.

The system also includes a radiator fluidly connected to the engine and the heat exchanger. The radiator is adapted to cool the engine coolant by transferring heat from the coolant to ambient air. In a first preferred embodiment, the engine thermostat is located between the engine and the radiator on the hot side of the radiator. A first valve is fluidly connected to both the engine and the heat exchanger and is adapted to selectively enable or prevent the flow of engine coolant from the engine to the heat exchanger. Preferably, the first valve receives engine coolant from a line leading to the heater core from the engine. Optionally, coolant is received from a line leading from the heater core to the engine. Also, the first valve receives cold engine coolant from the radiator. A controller is designed to place the system into a select one of three modes, including a heater priority mode where the first valve is positioned to receive coolant but does not receive it due to the position of the engine thermostat, a heating mode wherein hot engine coolant flows directly to the heat exchanger from the engine, and a cooling mode wherein cool engine coolant flows directly to the heat exchanger from the radiator, whereby the transmission fluid is heated in an efficient manner with minimal impact on passenger compartment heating. The system also includes a coolant return line between the radiator's low temperature section and high temperature section to ensure that flow will occur in the low temperature section of the radiator whenever flow occurs in the high temperature section of the radiator regardless of the first valve's position. The coolant return line preferably includes either a flow restrictor or a relief valve and is located either internal or external to the radiator.

In a second preferred embodiment, a second valve is provided between the radiator and the heat exchanger, with the second valve being adapted to allow fluid to flow from the radiator to a select one of the engine and the heat exchanger, thus providing for a third mode giving priority to the heater core so that the passenger compartment is heated quickly and coolant passes the heat exchanger. In a third embodiment, the second valve selectively sends cold coolant directly to the heat exchanger through a direct flow line and the first valve is located so as to accept hot coolant from the engine and selectively provide hot coolant to the heat exchanger by sending the hot coolant through the direct flow line. In a fourth embodiment, the second valve opens and closes flow from the low temperature radiator to the heat exchanger and incorporates the coolant return line as described in regard to the first embodiment.

Preferably, the radiator includes a high temperature section, a low temperature section and a cold coolant supply channel extending between the radiator and the heat exchanger, with the second valve being located in the cold coolant supply channel and connected to the low temperature section to selectively send cold engine coolant back through a thermostat to the engine. The system includes a heater core fluid return channel extending between the heater core and the engine, as well as a hot coolant return channel leading from the heat exchanger to the heater core fluid return channel. A heater core fluid channel extends between the engine and the heater core and a hot coolant supply channel leads from the heater core fluid channel to the first valve. A cold coolant supply channel extends between the radiator and the first valve, with the second valve being located in the cool coolant supply channel. A shunt channel extends between the first valve and the heat exchanger.

A series of temperature sensors and timers are employed for valve control purposes. More specifically, a first temperature sensor senses transmission fluid temperature. A second temperature sensor indirectly infers the temperature of automatic transmission fluid leaving the transmission case. A third temperature sensor measures engine coolant temperature. A first timer determines when to switch the first and second valves based on a rate of change of temperature of the engine coolant and a time value based on a starting temperature. A second timer determines when to switch the first and second valves based on movement of a transmission control switch and has a time value based on the starting temperature. The starting temperature is preferably a temperature indicative of the temperature of the automatic transmission fluid at the time the engine is started. For example, the temperature of the engine coolant, the automatic transmission fluid in the sump, or ambient temperature are all useable as a starting temperature.

In the first preferred embodiment, the temperature of transmission fluid in the motor vehicle is preferably controlled by having the system selectively enter a heater priority mode, an automatic transmission fluid heating mode or an automatic transmission fluid cooling mode. The system enters the automatic transmission fluid heating mode by sending hot engine coolant to the heat exchanger for heating the automatic transmission fluid by transferring heat from the hot engine coolant to the automatic transmission fluid. The system enters the automatic transmission fluid cooling mode by sending cold engine coolant to the heat exchanger for cooling the automatic transmission fluid by transferring heat from the automatic transmission fluid to the cold engine coolant. The system enters the heater priority when the valve is positioned to receive cold engine coolant before the engine thermostat opens. This heater priority mode is only available for a relatively short period of time prior to when the engine warms up. The system switches between the modes based on a sensed temperature by using the valve to selectively provide either hot engine coolant from the engine or cold coolant from the radiator.

In the second, third and fourth preferred embodiments of the invention, the temperature of transmission fluid in the motor vehicle is preferably controlled by having the system selectively enter one of a heater core priority mode, an automatic transmission fluid heating mode or an automatic transmission fluid cooling mode. The system enters a heater priority mode by disabling automatic transmission fluid heating. Unlike the first preferred embodiment, the heater priority mode is entered independent of the engine's thermostat position. The system enters the automatic transmission fluid heating mode by sending hot engine coolant to a heat exchanger for heating the automatic transmission fluid by transferring heat from the hot engine coolant to the automatic transmission fluid. The system enters the automatic transmission fluid cooling mode by sending cold engine coolant to the heat exchanger for cooling the automatic transmission fluid by transferring heat from the automatic transmission fluid to the cold engine coolant. The system switches between the modes based on a sensed temperature. In the second preferred embodiment, the first valve selectively provides hot engine coolant from the engine, or cold engine coolant from the radiator to the heat exchanger, while the second valve selectively sends cold engine coolant either to the first valve or back to the engine. In the third preferred embodiment, the first valve selectively provides hot engine coolant from the engine, while the second valve selectively sends cold engine coolant either to the heat exchanger or back to the engine.

Each of the four preferred embodiments provides a system for heating and cooling automatic transmission fluid in a rapid and efficient manner, thereby reducing the viscosity of the transmission fluid and for cooling the transmission fluid when the transmission is subjected to heavy loads. Additional objects, features and advantages of the present invention will become more readily apparent from the following detailed description of preferred embodiments when taken in conjunction with the drawings wherein like reference numerals refer to corresponding parts in the several views.

DESCRIPTION OF PREFERRED EMBODIMENTS

Figure 1:
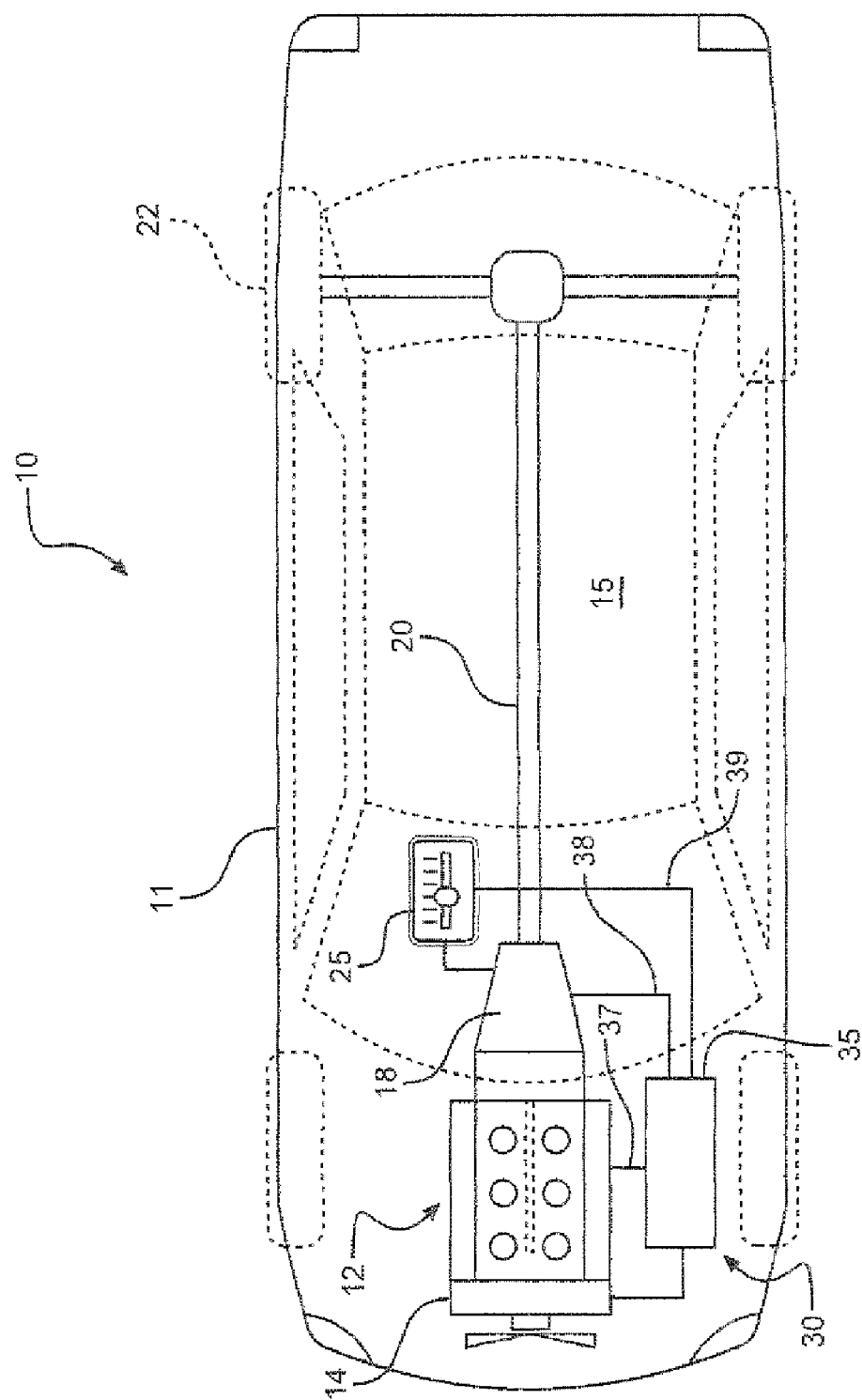
FIG. 1 is a diagram showing a vehicle incorporating a system for heating and cooling automatic transmission fluid in accordance with the invention.

With initial reference to FIG. 1, there is shown an automotive vehicle 10 having a body 11 and an internal combustion engine 12 with a radiator 14. Within body 11 there is located a passenger compartment 15 that is heated by heat transferred from engine 12 as discussed more fully below. Power from engine 12 is transmitted to a transmission 18, then to the other portions of a powertrain 20 and eventually to drive wheels 22. Transmission 18 may be shifted between park, drive and reverse settings by a control lever 25. Vehicle 10 is shown as a rear wheel drive vehicle but any type of powertrain arrangement, including front wheel, all wheel drive and hybrid systems, could be employed. A system 30 for controlling heating or cooling automatic transmission fluid flowing through transmission 18 includes a controller 35 connected to engine 12, transmission 18, and shift lever 25 by communication lines 37, 38 and 39 respectively. In accordance with the invention, system 30 functions by warming up transmission fluid present in transmission 18 in a rapid and efficient manner, thereby reducing the viscosity of the transmission fluid and cooling the transmission fluid when transmission 18 is subjected to heavy loads as more fully discussed below.

Figure 2:
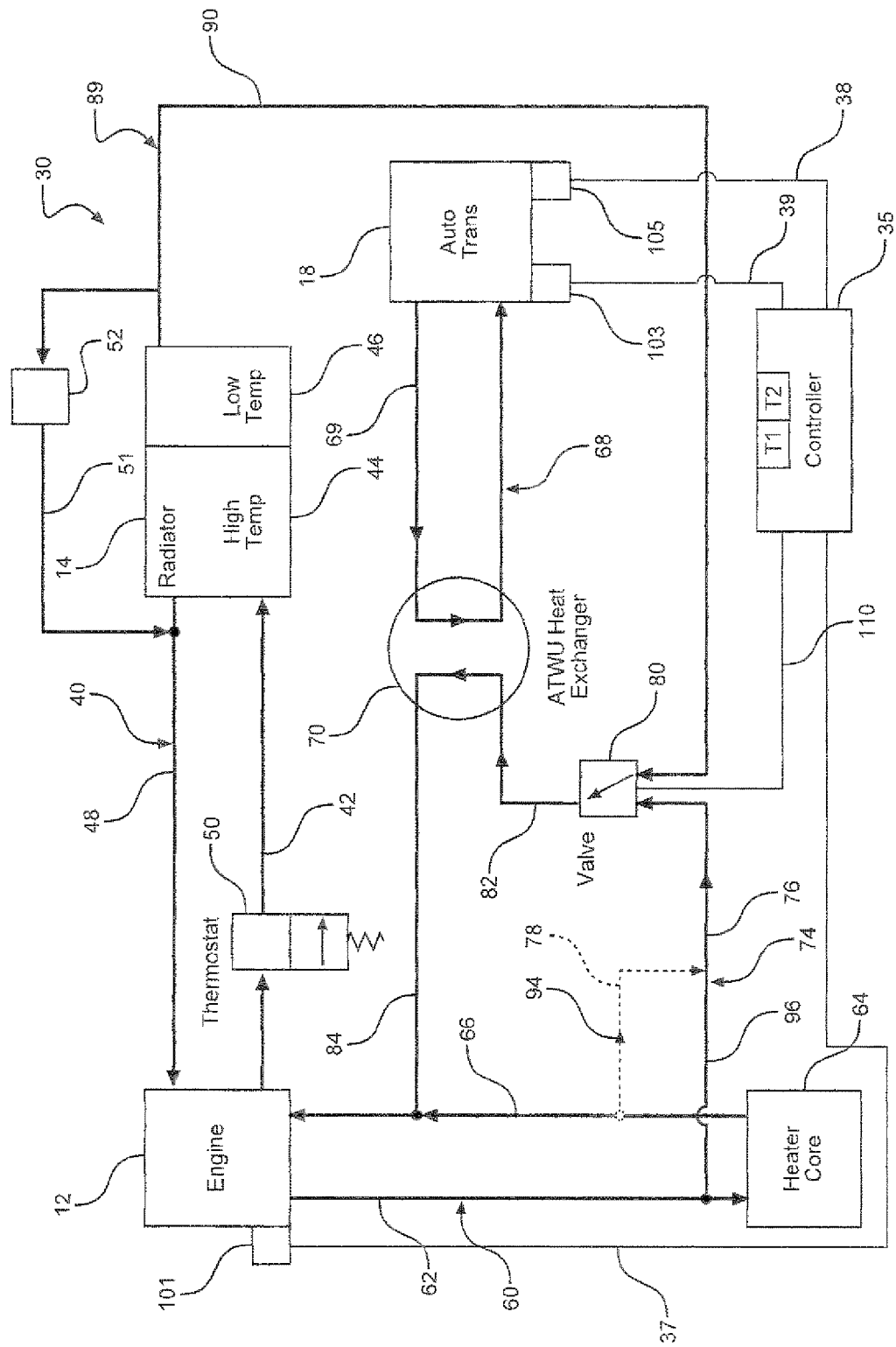
FIG. 2 is a schematic diagram of a first preferred embodiment of the system in FIG. 1 in a heater priority mode using a single valve and an engine thermostat.

Referring to FIG. 2, there is shown a schematic diagram of a first preferred embodiment of system 30 in a heater priority mode. An engine cooling circuit 40 is shown having a hot coolant line 42 extending from engine 12 to radiator 14. Engine 12 is a conventional internal combustion engine having an engine block containing the usual coolant passages arranged to allow engine coolant to absorb heat generated by the operation of engine 12. The hot engine coolant is pumped through hot coolant line 42 to radiator 14. Radiator 14 is preferably designed to have a high temperature section 44 and a low temperature section 46. Radiator 14 is designed to carry heat away from the hot engine coolant and transfer the heat to ambient air flowing over radiator 14 and allow the cooled engine coolant to return to engine 12 through cold engine coolant line 48 thus completing engine cooling circuit 40. Engine cooling circuit 40 is selectively opened or closed to engine coolant flow by a thermostat 50, preferably located between radiator 14 and engine 12 in hot coolant line 42. Thermostat 50 closes off cooling circuit 40 upon engine startup when engine 12 is cold. Thermostat 50 opens up cooling circuit 40 when engine 12 becomes hot enough to need cooling and thus regulates the engine temperature. A return line 51 is provided with a flow restrictor device 52 or relief valve located either internally or externally to radiator 14. Return line 51 assures proper flow through radiator 14 so that both high temperature section 44 and low temperature section 46 receive coolant flow simultaneously.

A passenger compartment heating circuit 60 is shown as starting at engine 12, extending through heater core supply line 62 to a heater core 64 and then back to engine 12 through a heater core return line 66. Engine coolant always flows through heating circuit 60 when engine 12 is running, however the amount of heat carried by the engine coolant may vary as described more fully below. Regardless, excess heat from engine 12 is transferred to hot engine coolant that passes through heater core supply line 62 to heater core 64. In heater core 64, heat is then transferred from the hot engine coolant to air that is used to heat passenger compartment 15. An automatic transmission temperature regulation circuit 68 includes a transmission temperature regulation fluid line 69 that guides transmission fluid from transmission 18 to a heat exchanger 70 and back to transmission 18. Heat exchanger 70 preferably transmits heat either to or from the transmission fluid flowing through temperature regulation circuit 68 in a manner discussed in more detail below.

A transmission preheating circuit 74 receives hot engine coolant from passenger compartment heating circuit 60. Preferably, transmission preheating circuit 74 connects to supply line 62 of heating circuit 60 just up stream of heater core 64 through a main preheating supply line 76. Alternatively, transmission preheating circuit 74 receives hot engine coolant from heater core return line 66 through an optional preheating supply line 78, which connects to main preheating supply line 76. In either case, preheating supply line 76 is connected to a first valve 80 which in turn is connected to a shunt line 82 extending between first valve 80 and heat exchanger 70. Preheating circuit 74 also includes a preheating return line 84 for returning engine coolant to passenger compartment heating circuit 60. A transmission cooling circuit 89 includes a cold engine coolant supply line 90 that extends from radiator 14 to first valve 80. Cooling circuit 89 provides relatively cool engine coolant to first valve 80.

Figure 3:
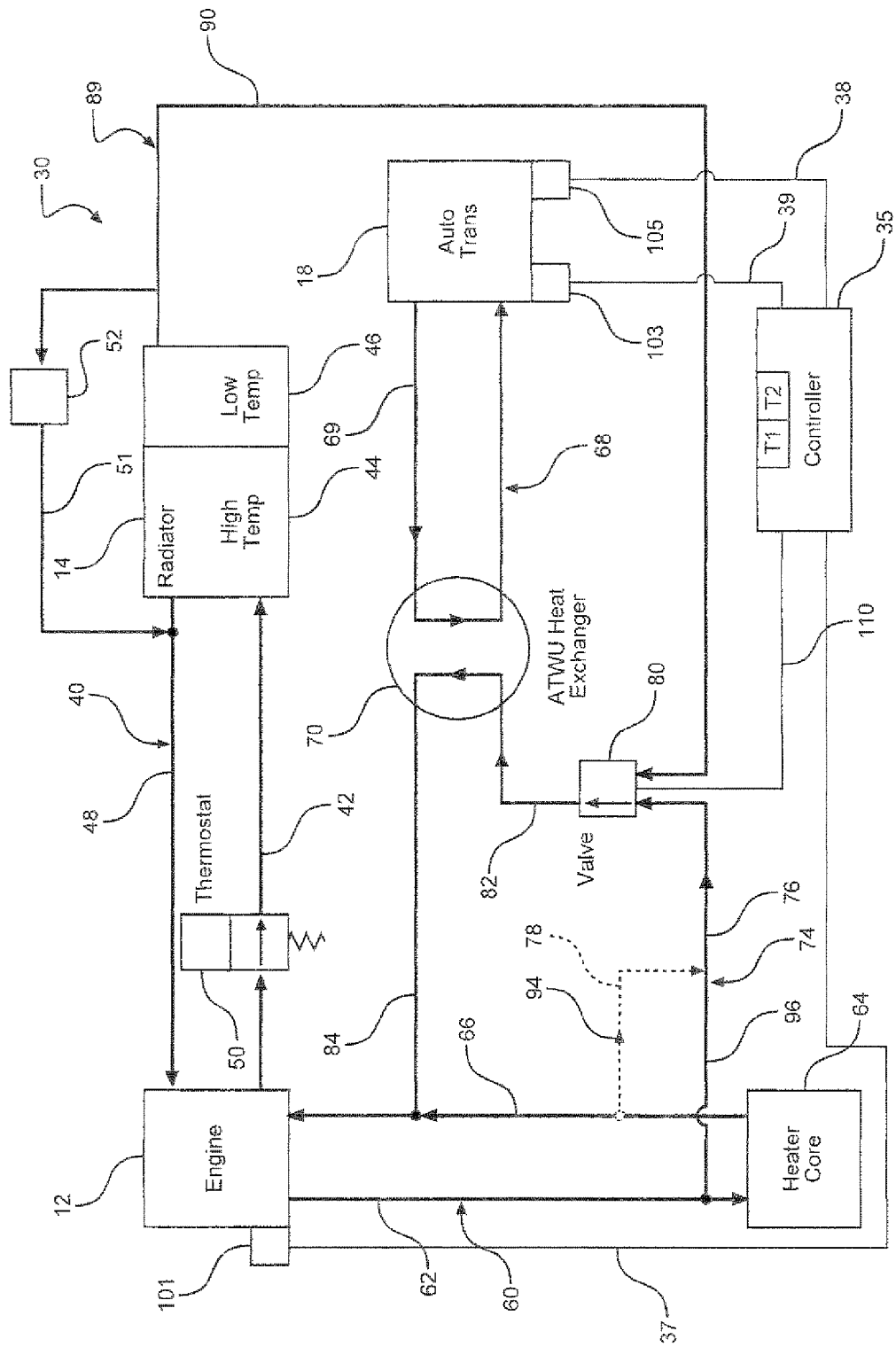
FIG. 3 is a schematic diagram of the first preferred embodiment of the system in FIG. 2 in an automatic transmission fluid heating mode.

In FIG. 2, system 30 is shown in a heater priority mode. Since thermostat 50 also will prevent coolant flow to first valve 80 when engine 12 is cold, no coolant travels from radiator 14 to exchanger 70 even though first valve 80 is positioned to allow such flow. The heater priority mode only lasts a short time until engine 12 warms up and then thermostat 50 will switch positions to that shown in FIGS. 3 and 4. In FIG. 3, first valve 80 is positioned to allow a flow 94 of hot engine coolant through optional supply line 78 or a flow 96 of hot engine coolant through supply line 76 to heat exchanger 70 thus placing system 30 in an automatic transmission fluid heating mode. Heat from engine 12 is transferred in engine 12 to hot engine coolant flow 96 that flows through supply line 62 and then preheating supply line 76 to first valve 80 and shunt line 82. The heat then transfers from the hot engine coolant to the relatively cool automatic transmission fluid. The heat then travels through transmission temperature regulation circuit 68 to preheat the transmission fluid in transmission 18 when system 30 is operating in cold ambient temperatures. By contrast, in FIG. 4, system 30 is shown in an automatic transmission fluid-cooling mode. In the fluid-cooling mode, first valve 80 is positioned to allow a flow 97 of relatively cool engine coolant through engine coolant supply line 90 to first valve 80. The cool engine coolant travels through shunt line 82 to heat exchanger 70 and functions to cool the automatic transmission fluid flowing through temperature regulation circuit 68.

Controller 35 is connected several temperature sensors in order to determine a starting temperature that is indicative of the temperature of the automatic transmission fluid when engine 12 is started. For example, controller 35 is connected to a temperature sensor 101 through communication line 37 to allow controller 35 to read the temperature of engine 12 or the engine coolant in engine 12. Controller 35 is also connected to temperature sensors 103 and 105 through communication line 38 and 39 so that controller 35 is allowed to read the temperature of the transmission fluid in the sump or a transmission case exit. Alternatively, the case exit temperature is inferred from the sump fluid temperature and other signals available to controller 35. Additionally, ambient temperature is measured from any location such as the air intake to engine 12 or the air flowing in passenger compartment 15. Preferably, any one of these temperatures, or other measured temperatures indicative of the automatic transmission fluid when engine 12 is started, constitute the starting temperature. Controller 35 also includes a first timer T1 and a second timer T2. With this configuration, controller 35 is able to control the position of valve 80 through control line 110 depending on the sensed temperatures and based on certain timing to switch system 30 between the automatic transmission heating mode of FIG. 2 and the automatic transmission cooling mode of FIG. 3 as discussed more fully with respect to FIG. 10.

Figure 5:
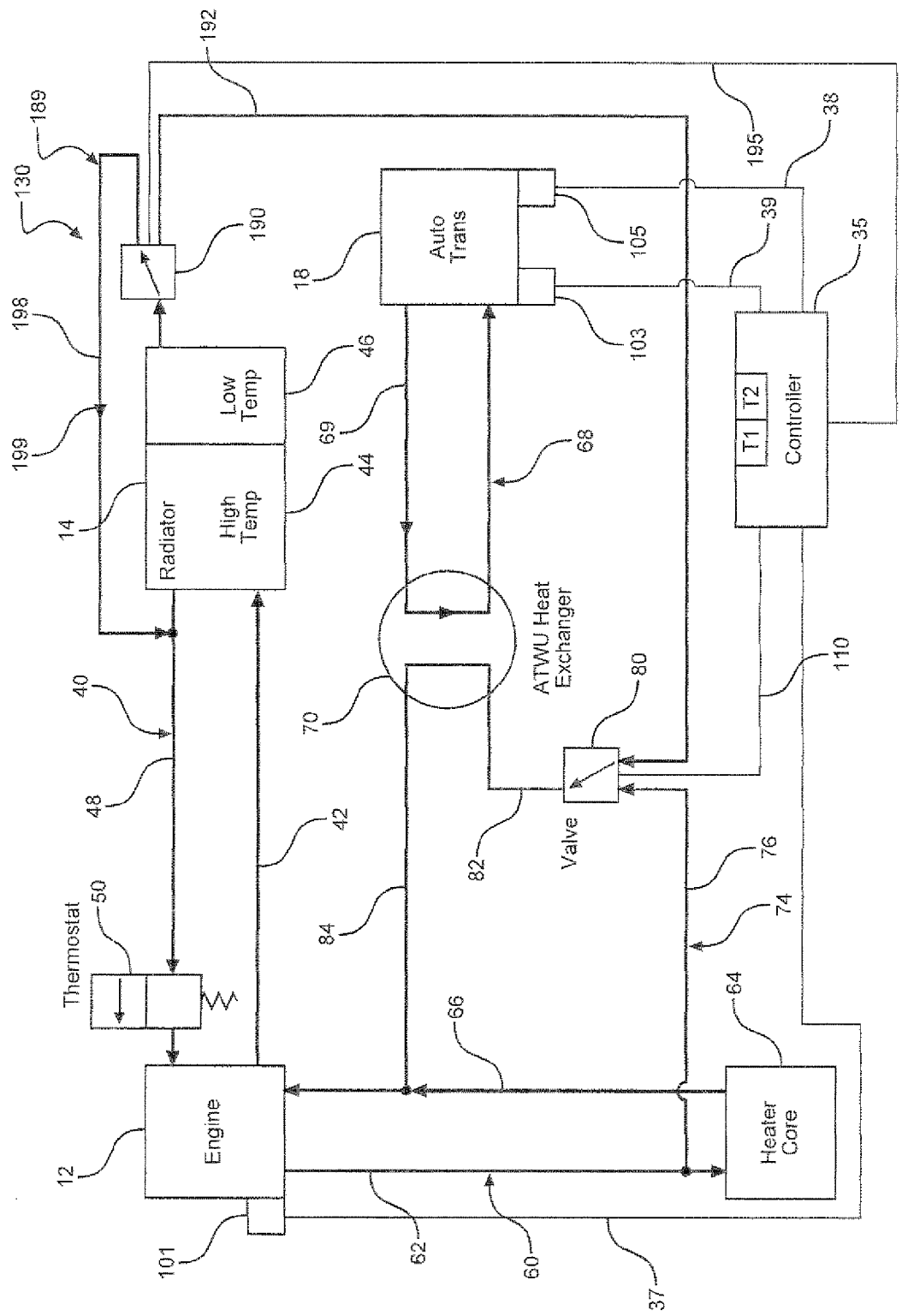
FIG. 5 is a schematic diagram of a second preferred embodiment of the system in FIG. 1 in a heater priority mode independent of the engine thermostat using two valves.
Figure 6:
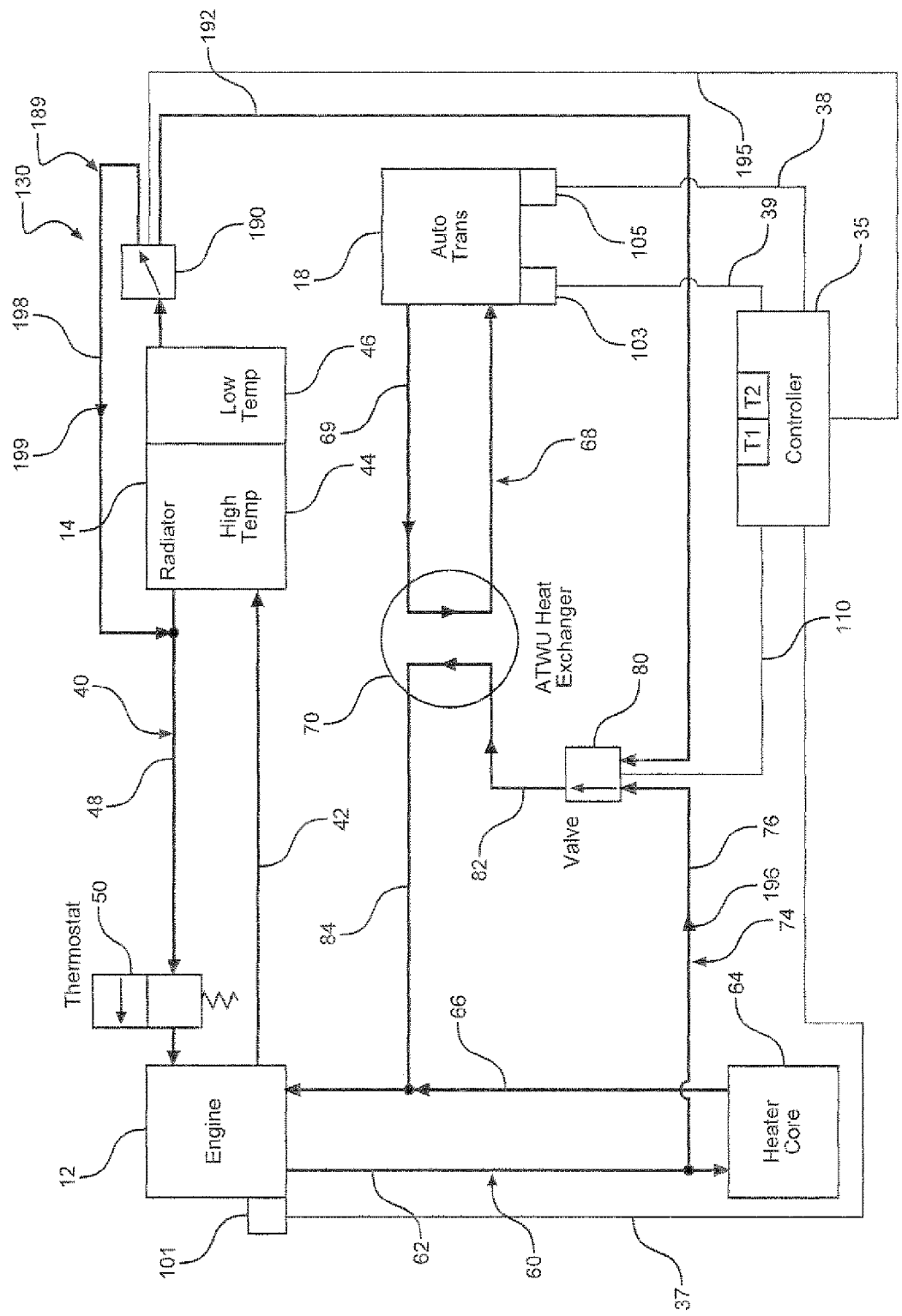
FIG. 6 is a schematic diagram of the second preferred embodiment of the system of FIG. 5 in an automatic transmission fluid heating mode.
Figure 7:
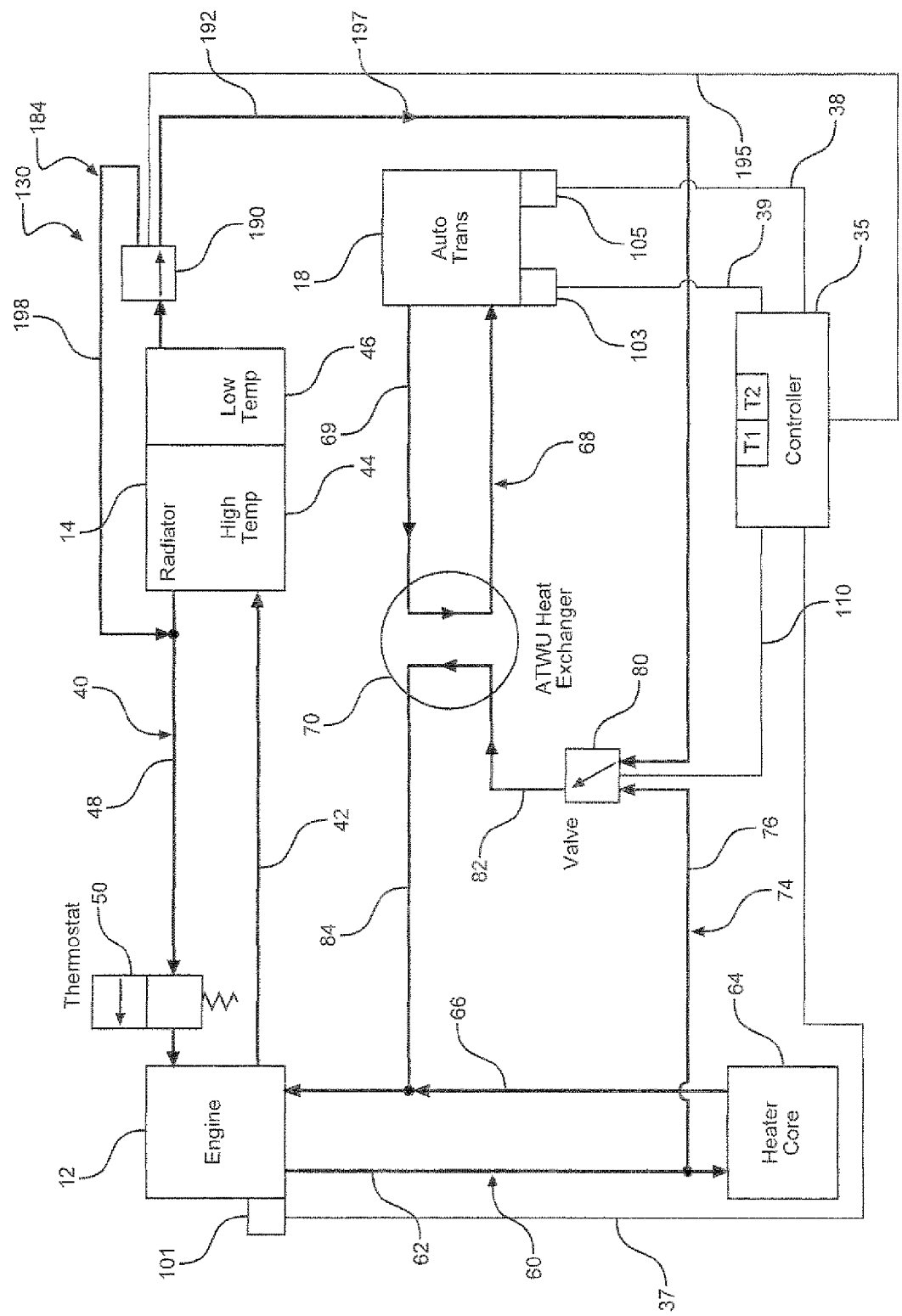
FIG. 7 is a schematic diagram of the second preferred embodiment of the system in FIG. 5 in an automatic transmission fluid cooling mode.

Turning to FIGS. 5-7, there is shown a second preferred embodiment of the invention. Most of the parts of the second preferred embodiment are the same as the first preferred embodiment and like reference numerals are used for like parts. Only the differences between the two embodiments will be discussed here. In the second preferred embodiment, a system 130 has a transmission cooling circuit 189 with a second valve 190 not found in the first preferred embodiment. Second valve 190 is connected to an engine coolant supply line 192. Second valve 190 is controlled by controller 35 through communication line 195 and is adapted to switch flow between a cold-coolant return conduit 198 and coolant line 192. Second valve 190 is positioned to selectively send cold engine coolant flow 199 back to engine 12 as in FIGS. 5 and 6, or to send cold engine coolant to valve 80 as in FIG. 7 to place system 130 in a transmission cooling mode. When second valve 190 sends fluid back to engine 12, system 130 is placed in a heater priority mode when valve 80 is in a position as shown in FIG. 5, or an automatic transmission fluid heating mode when valve 80 is in a position as shown in FIG. 6. In the heater priority mode, system 130 does not provide any flow through heat exchanger 70. In the transmission heating mode, a flow 196 of hot engine coolant is sent to heat exchanger 70 from engine 12 and in the automatic transmission fluid cooling mode, a flow 197 of cold engine coolant is sent to heat exchanger 70 from radiator 14. In the second embodiment, thermostat 50 is preferably located in coolant line 48 and does not affect switching system 130 between modes.

Figure 8:
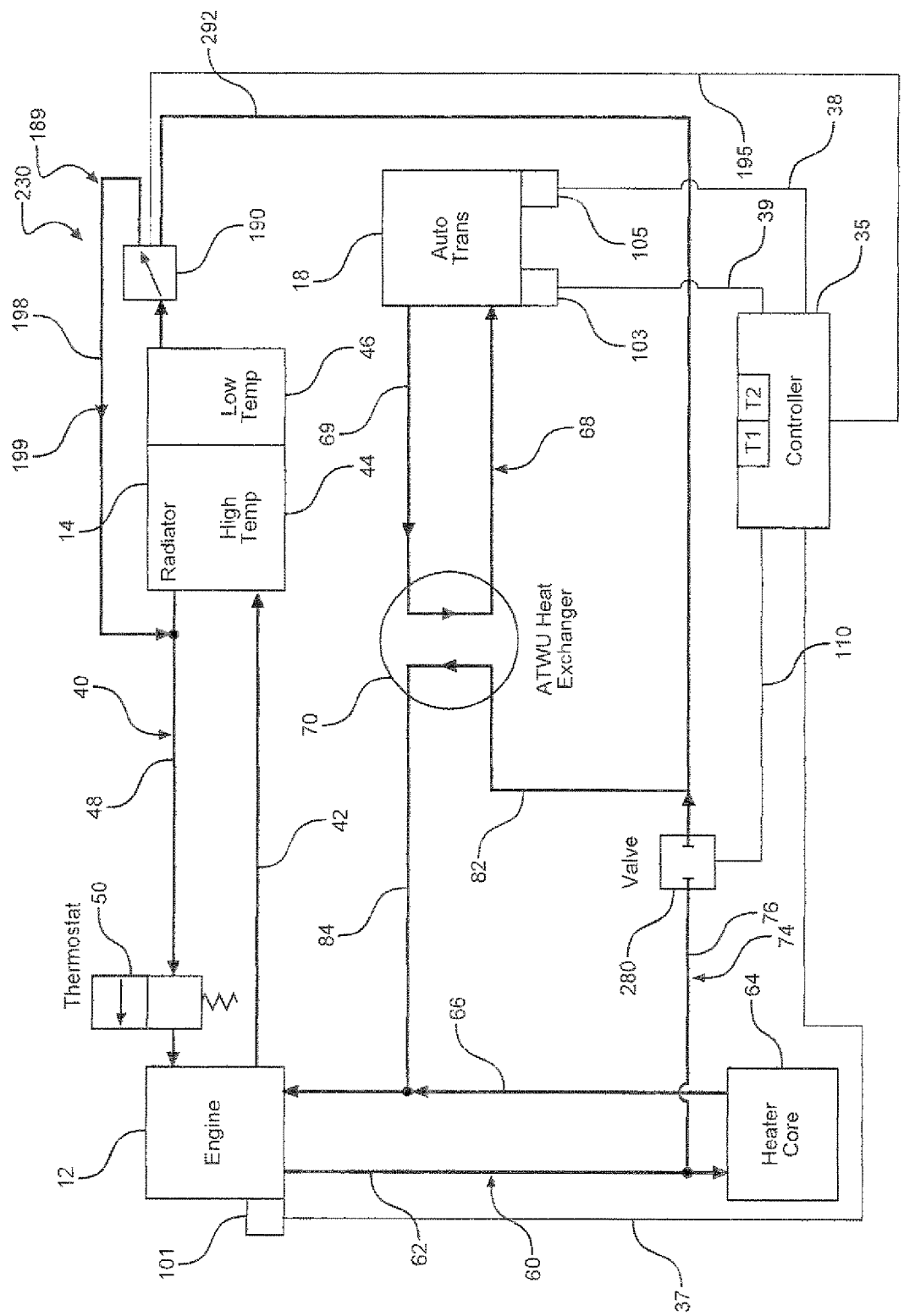
FIG. 8 is a schematic diagram of a third preferred embodiment of the system in FIG. 1 in a heater priority mode using two valves.
Figure 9:
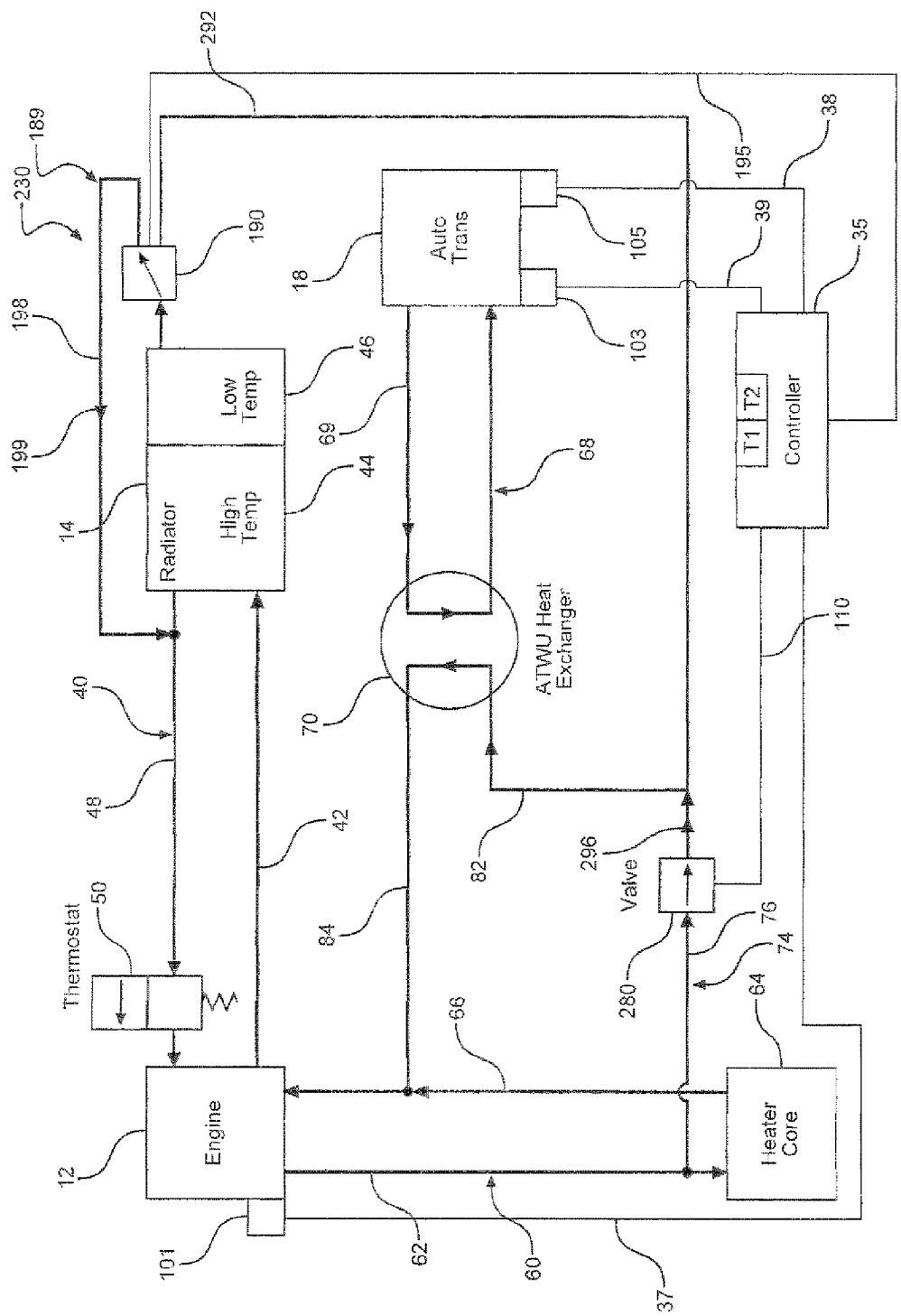
FIG. 9 is a schematic diagram of the third preferred embodiment of the system of FIG. 8 in an automatic transmission fluid heating mode.
Figure 10:
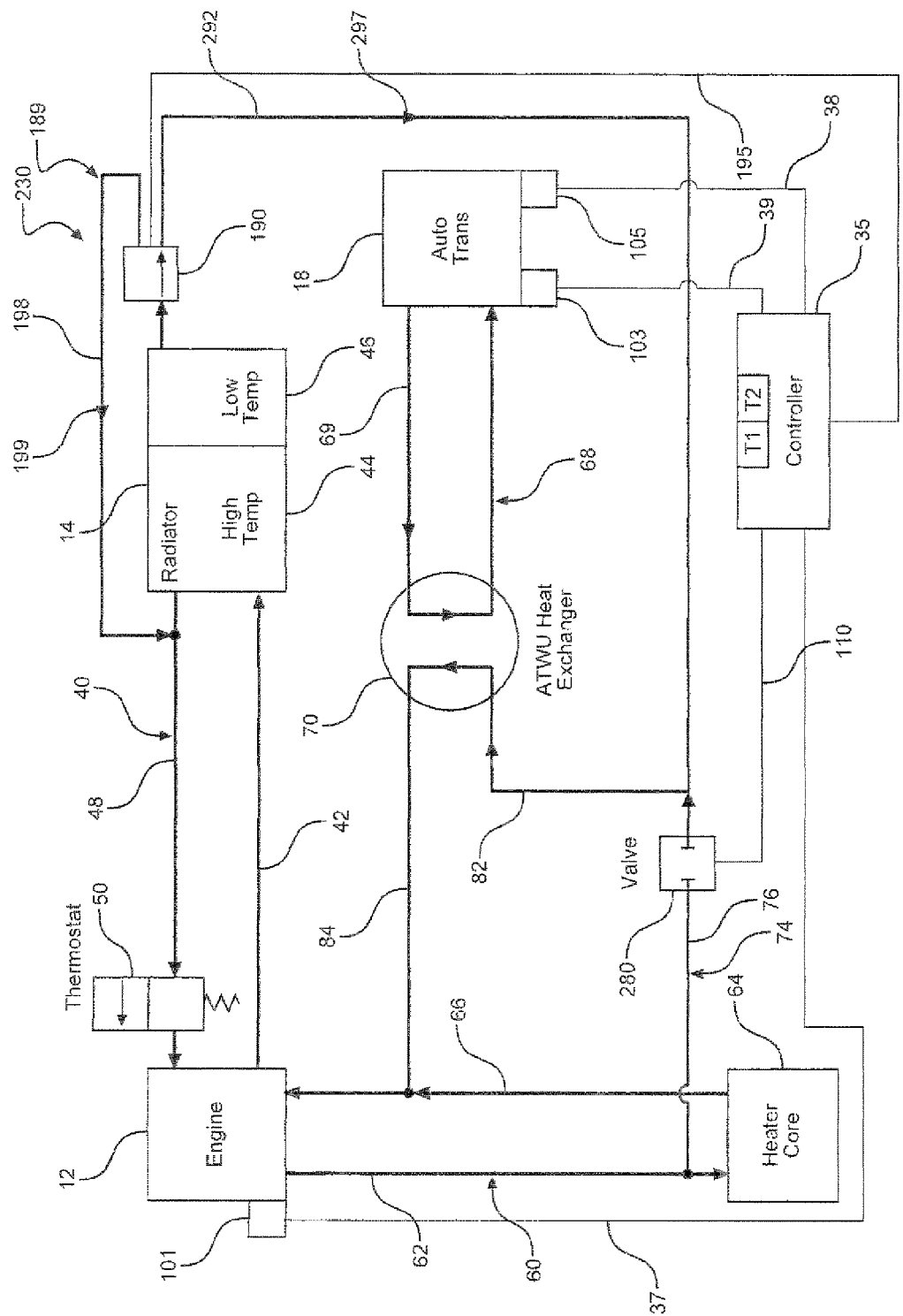
FIG. 10 is a schematic diagram of the third preferred embodiment of the system in FIG. 8 in an automatic transmission fluid cooling mode.

Turning now to FIGS. 8-10, there is shown a third preferred embodiment of the invention. Most of the parts of the third, preferred embodiment are the same as the second preferred embodiment and like reference numerals are used for like parts. Only the differences between the two embodiments will be discussed here. Specifically, valve 80 of the second preferred embodiment which receives flow from both line 76 and line 192, has been replaced with a valve 280 that only receives coolant flow from line 76. Line 192 has been replaced with line 292 that directly connects second valve 190 to line 82. In FIG. 8, system 230 is in a heater priority mode with no coolant flowing through heat exchanger 70 because first valve 280 is closed preventing the flow of hot engine coolant from engine 12 through line 76, while valve 190 is set to return cold engine coolant back to engine 12 and prevents cold engine coolant from reaching heat exchanger 70. In FIG. 9, system 230 is in an automatic transmission fluid heating mode with a hot engine coolant flow passing through heat exchanger 70 because first valve 280 is open allowing the flow of hot engine coolant from engine 12 through line 76, while valve 190 is set to return cold engine coolant back to engine 12 and prevents cold engine coolant from reaching heat exchanger 70. In FIG. 10, system 230 is in an automatic transmission fluid cooling mode with a cold engine coolant flow passing through heat exchanger 70 because first valve 280 is closed preventing the flow of hot engine coolant from engine 12 through line 76, while valve 190 is set to supply cold engine coolant to heat exchanger 70 through line 292.

Figure 11:
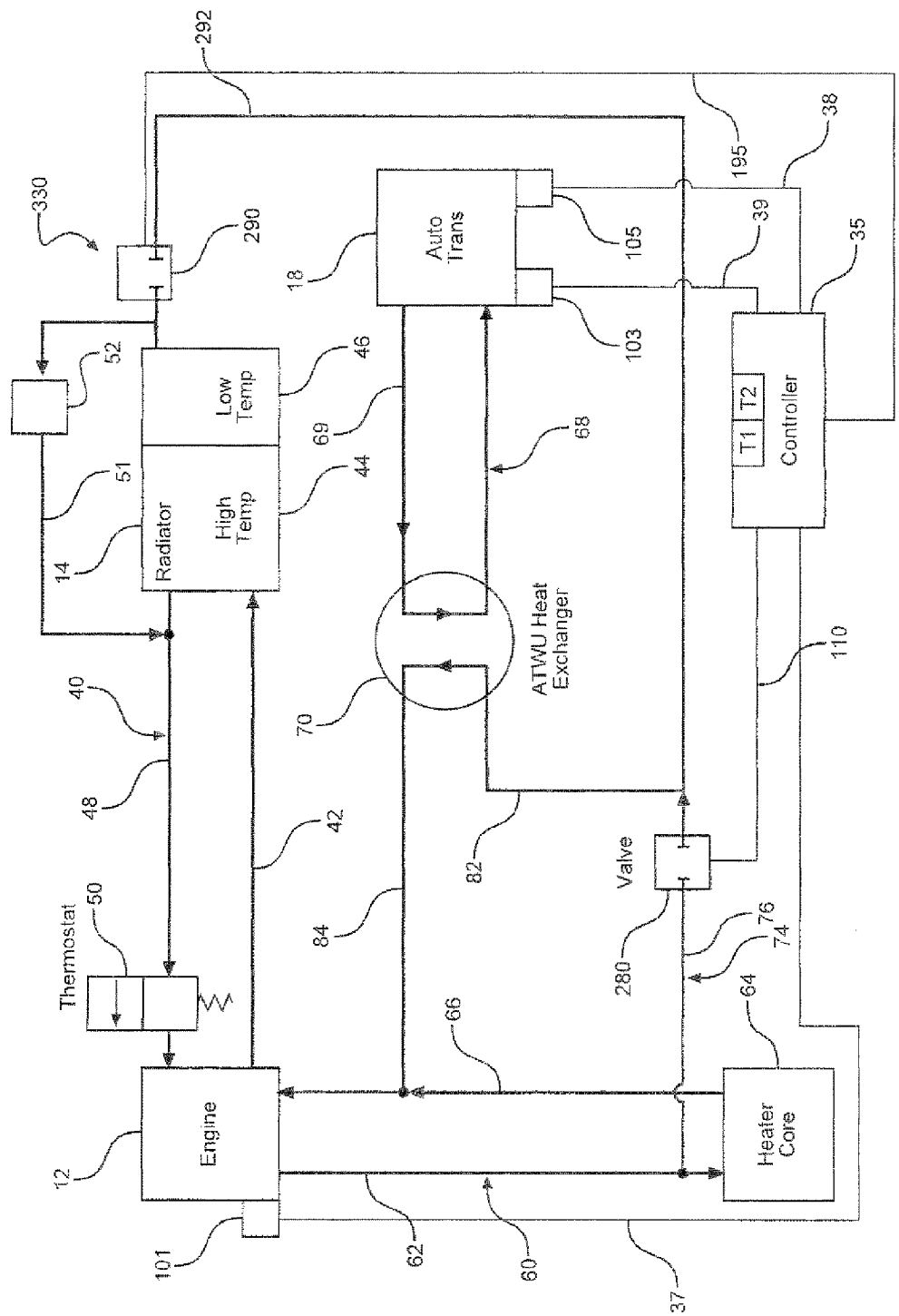
FIG. 11 is a schematic diagram of a fourth preferred embodiment of the system in FIG. 1 in a heater priority mode using two valves.
Figure 12:
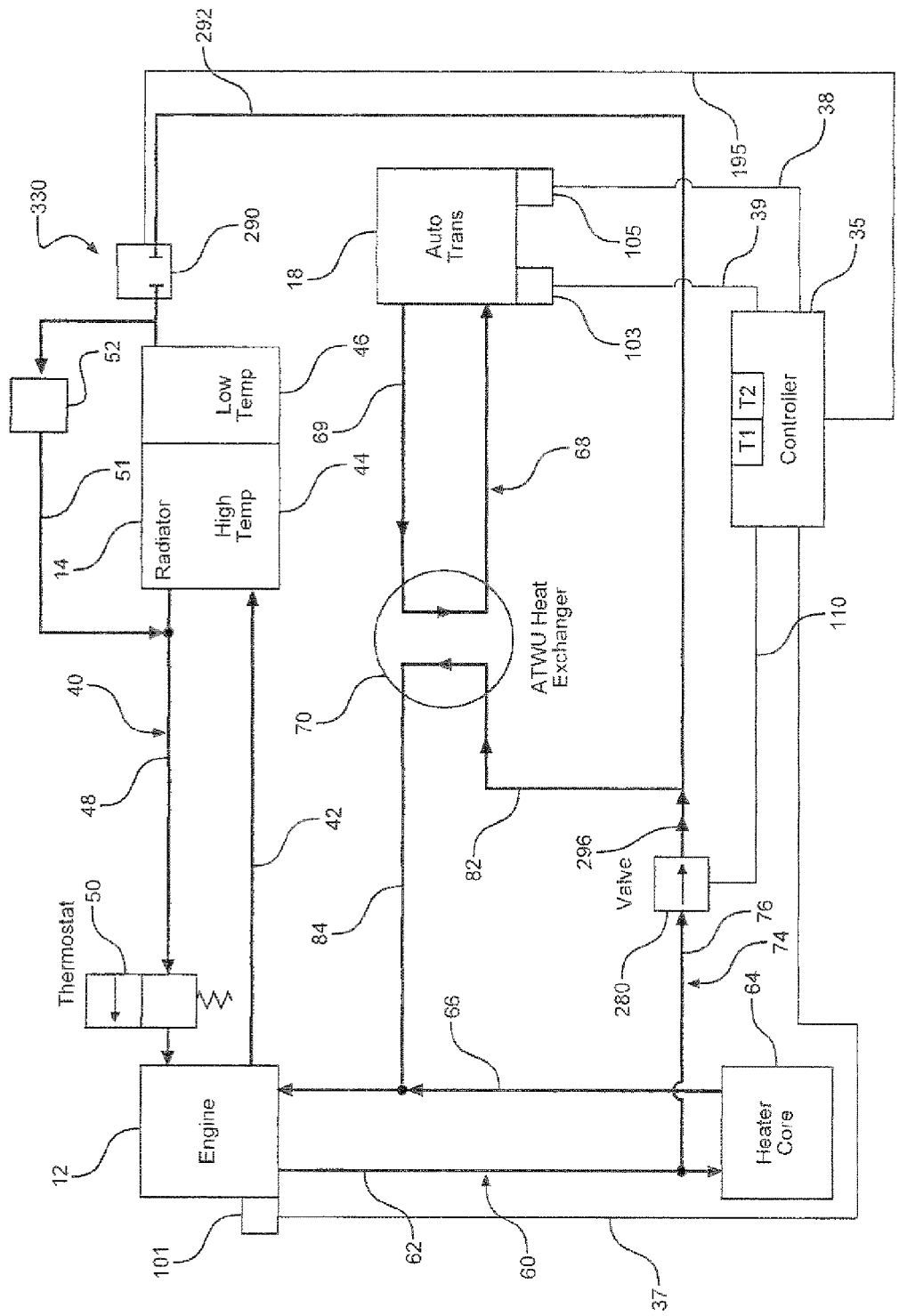
FIG. 12 is a schematic diagram of the fourth preferred embodiment of the system of FIG. 11 in an automatic transmission fluid heating mode.
Figure 13:
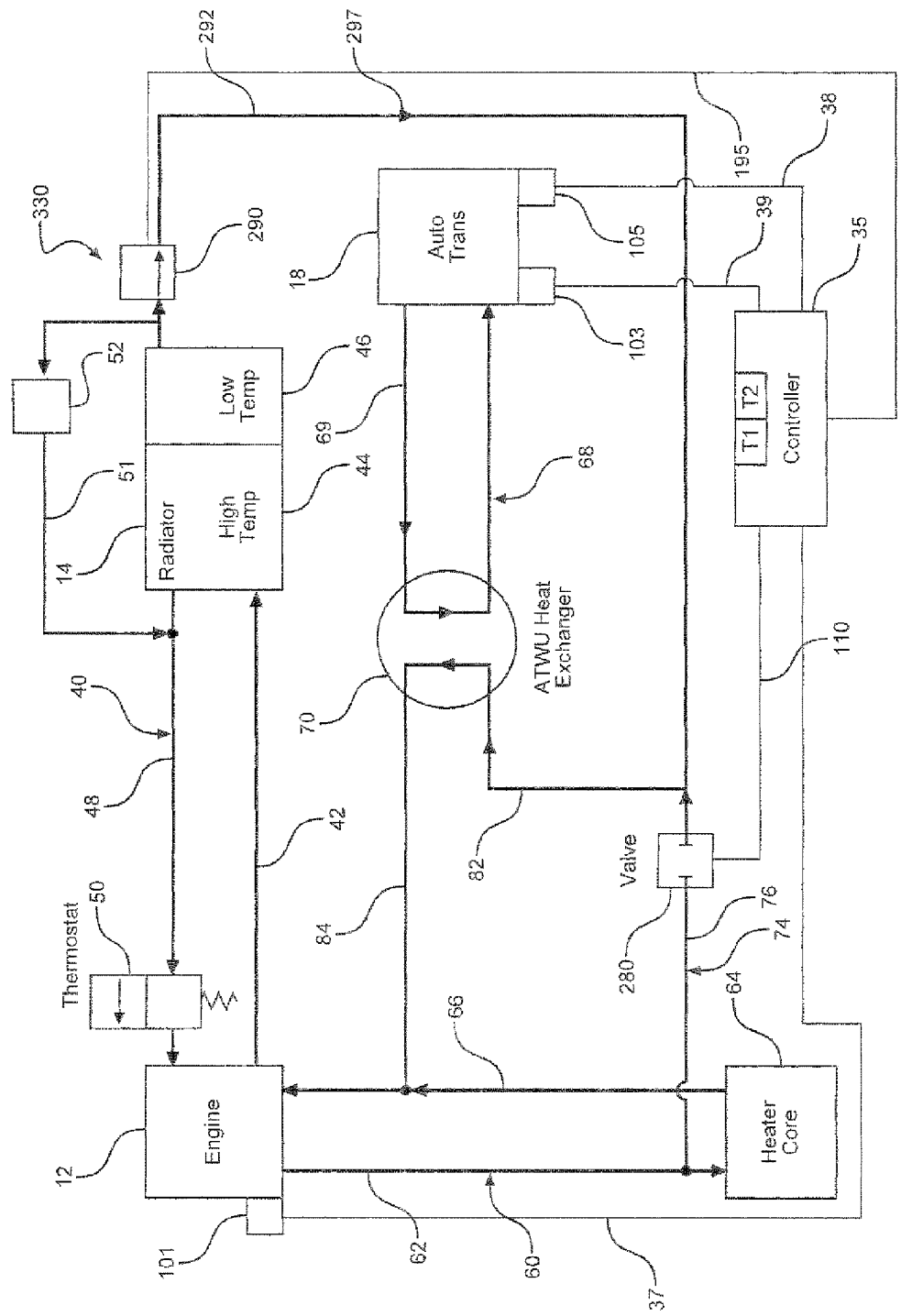
FIG. 13 is a schematic diagram of the fourth preferred embodiment of the system in FIG. 11 in an automatic transmission fluid cooling mode.

Turning now to FIGS. 11-13, there is shown a fourth preferred embodiment of the invention. Most of the parts of the fourth preferred embodiment are the same as the third preferred embodiment and like reference numerals are used for like parts. Only the differences between the two embodiments will be discussed here. Specifically, valve 190 of the third preferred embodiment has been replaced with valve 290 which is set to either allow or not allow flow from radiator 14 to heat exchanger 70. Additionally, return conduit 198 is not used but rather return line 51 and restriction device 52 from the first embodiment are used. Valves 280 and 290 are closed in FIG. 11 thus placing a system 330 into a heater priority mode. In FIG. 12, system 330 is in an automatic transmission fluid heating mode with a hot engine coolant flow passing through heat exchanger 70 because first valve 280 is open allowing the flow of hot engine coolant from engine 12 through line 76, while valve 290 is set to return cold engine coolant back to engine 12 and prevents cold engine coolant from reaching heat exchanger 70. In FIG. 13, system 330 is in an automatic transmission fluid cooling mode with a cold engine coolant flow passing through heat exchanger 70 because first valve 280 is closed preventing the flow of hot engine coolant from engine 12 through line 76, while valve 290 is set to supply cold engine coolant to heat exchanger 70 through line 292.

Figure 4:
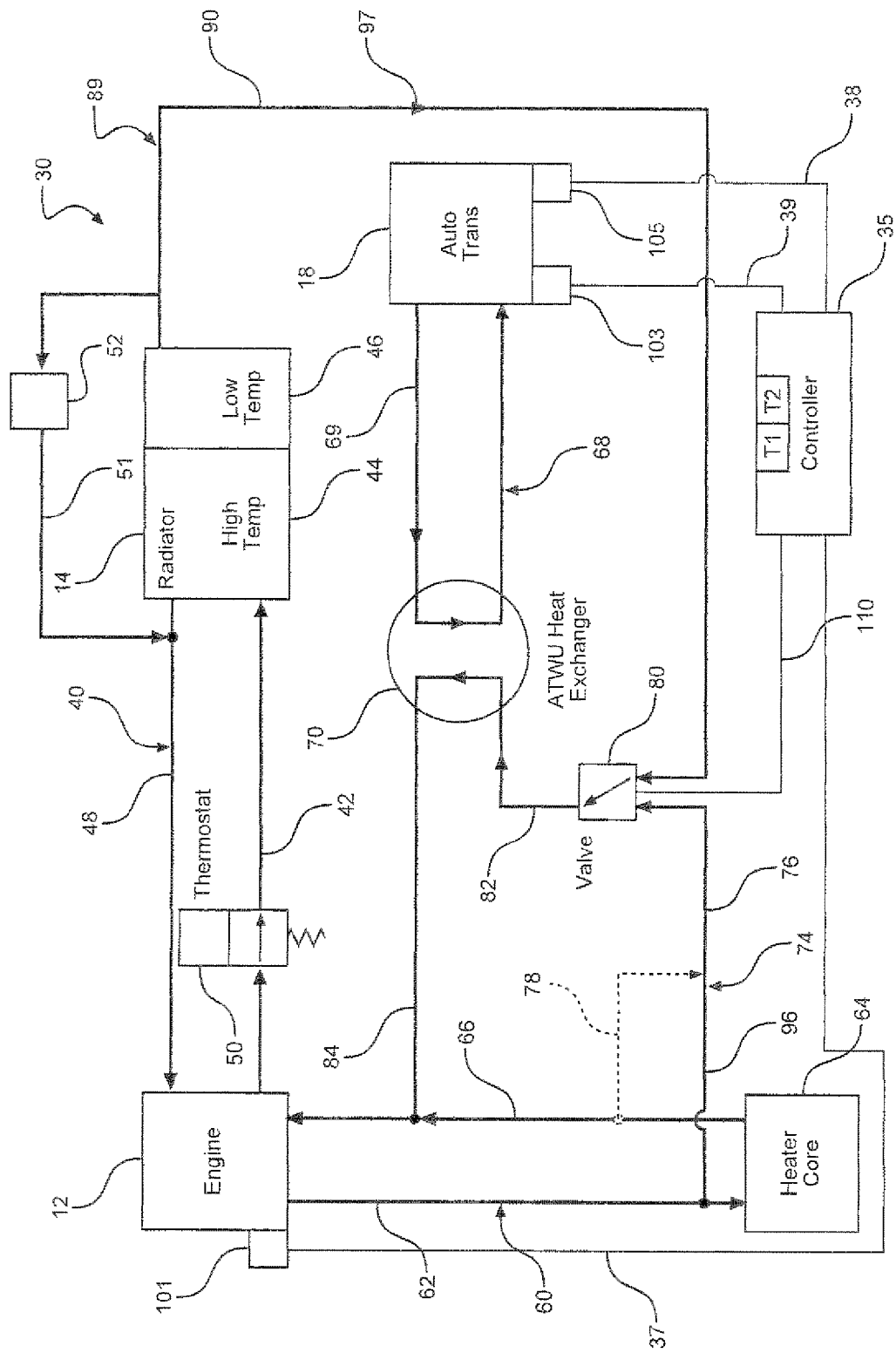
FIG. 4 is a schematic diagram of the first preferred embodiment of the system of FIG. 2 in an automatic transmission fluid cooling mode.
Figure 14:
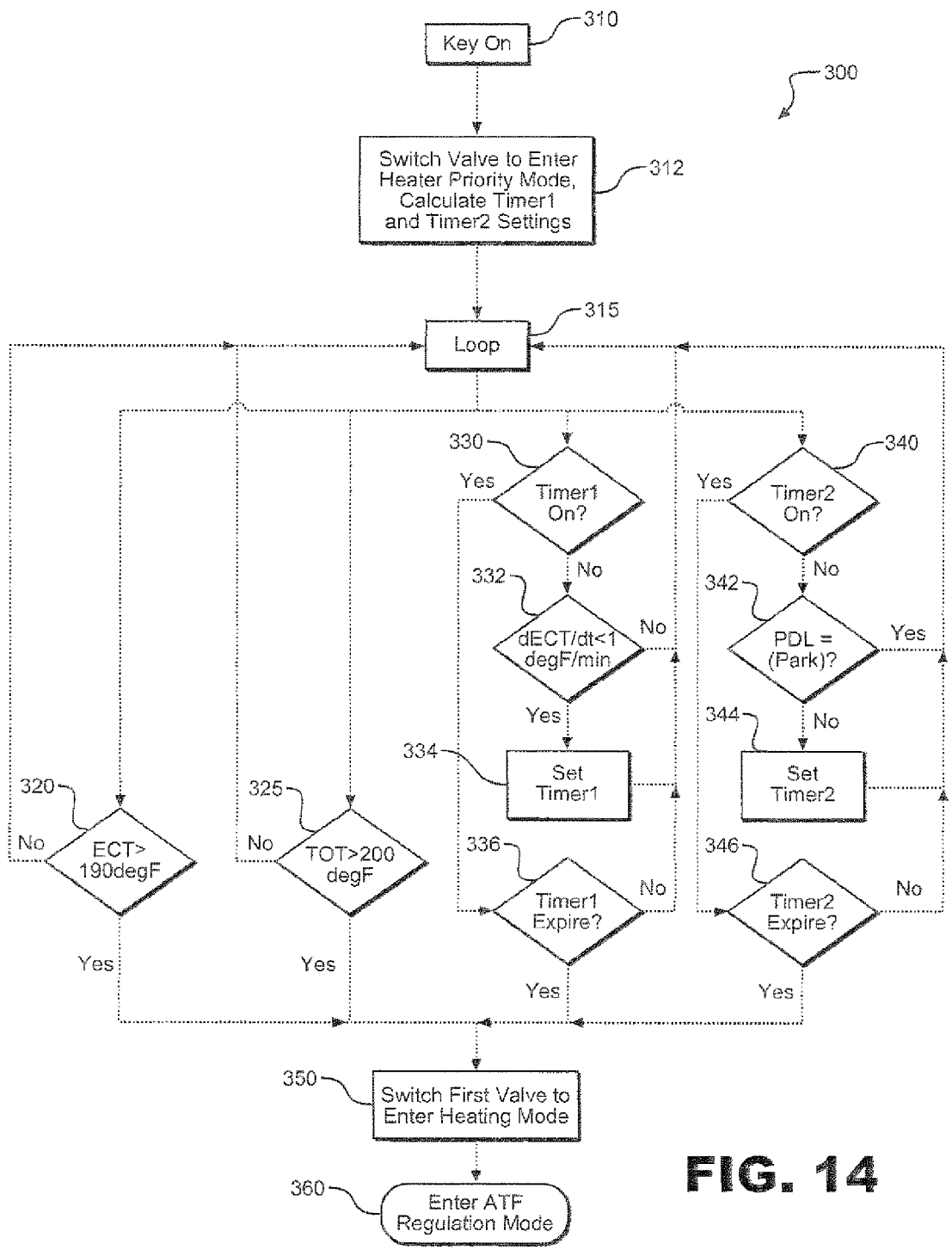
FIG. 14 is a flowchart showing a control routine employed in the system of FIG. 2 according to the first preferred embodiment of the invention.
Figure 15:
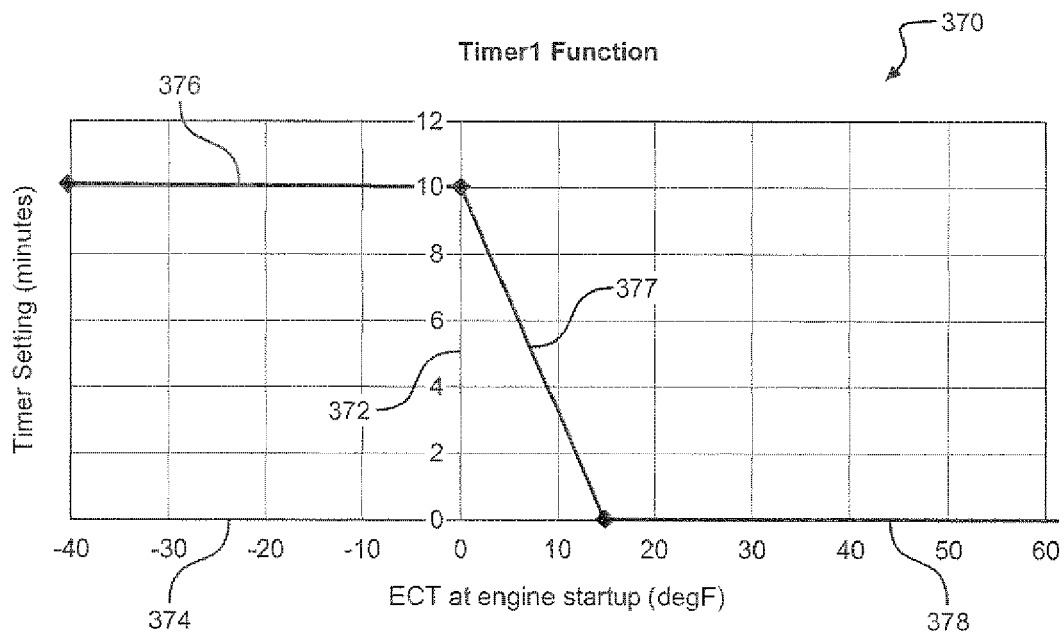
FIG. 15 is a graph showing a first timer setting versus engine coolant temperature at start-up in accordance with the invention.
Figure 16:
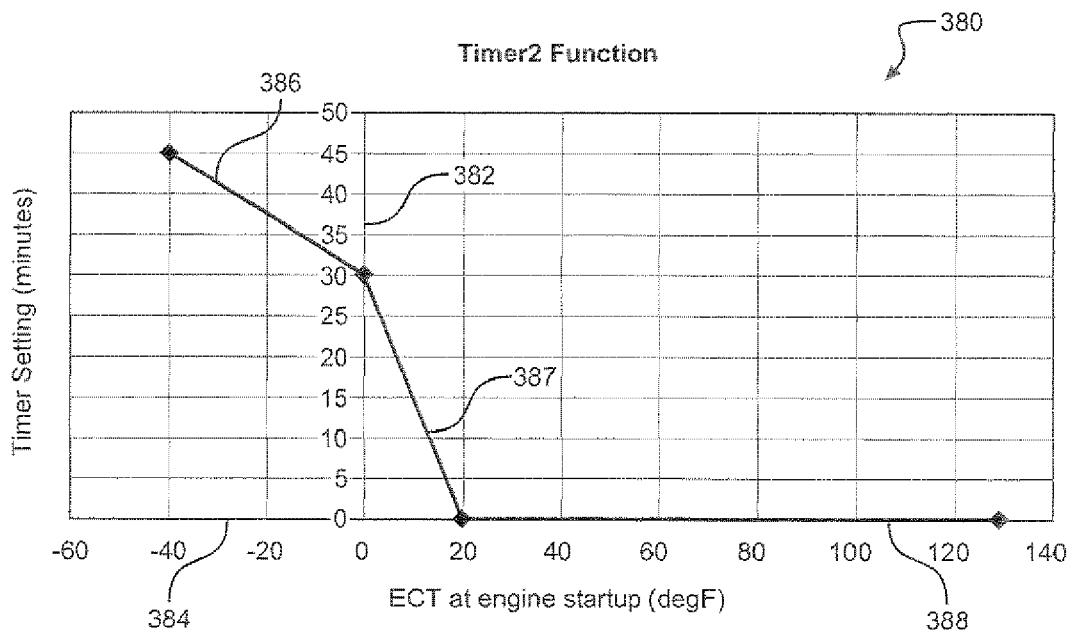
FIG. 16 is a graph showing a second timer setting versus engine coolant temperature at start-up in accordance with the invention.

FIG. 14 is a flowchart showing a control routine 300 employed in system 30 of FIGS. 2-4 according to the first preferred embodiment of the invention. Control routine 300 starts when a key ds turned, as in step 310, to start engine 12. Controller 35 then switches valve 80 to the position shown in FIG. 2 while engine thermostat 50 is closed to place system 30 in the automatic transmission fluid heater priority mode. Also, controller 35 calculates settings for first and second timers T1, T2 at step 312 as discussed more fully with respect to FIGS. 15 and 16. While the graphs of FIGS. 15 and 16 show settings for timers T1 and T2 being set by measured engine coolant temperature, the settings for timers T1 and T2 are optionally set by any measured temperature indicative of the automatic transmission fluid when engine 12 is started that constitutes the starting temperature as discussed more fully above. Loop 315 simply represents a logical flow node. Controller 35 keeps valve 80 activated until one of four events occurs. At step 320 the engine coolant temperature is measured and if the engine coolant temperature is not greater than a threshold of preheat 190 degrees Fahrenheit (88° C.) control routine 300 continues. At step 325, the transmission fluid's temperature in the sump is checked, and if the temperature is not above 200 degrees Fahrenheit (93° C.), control routine 300 continues. At step 330, timer T1 is checked. If timer T1 is not on at step 330, then the rate of change of the transmission temperature is checked at 332. If the rate of change is less than a rate threshold of preferably one degree Fahrenheit (5/9° C.), per minute, then the timer is set at step 334. While timer T1 is running at step 336, the routine continues. At step 340, timer T2 is checked. If timer T2 is not running at step 340, then control lever 25 is checked to determine if transmission 18 is in park. If transmission 18 is moved from park into reverse, drive or any other position, then timer T2 is set. While timer T2 is running, control routine 300 continues. If the engine coolant temperature drops below 190 degrees Fahrenheit (88° C.), or the temperature of the automatic transmission fluid in the sump drops below 200 degrees Fahrenheit (93° C.), or either timer T1, T2 runs out, then control routine 300 switches valve 80 at step 350 and at step 360 the automatic transmission fluid regulation mode is entered. While the listed temperatures are preferable, other temperatures may be used in step 320 and 325 to determine when the control routine enters step 350. For example, a lower temperature of 160 degrees Fahrenheit (71° C.) may be used in step 320. Preferably, the temperature setting in step 320 should be below a setting present for thermostat 50 to ensure proper operation of routine 300.

FIG. 15 is a graph 370 showing a first timer setting 372 verses the starting temperature, in this case engine coolant temperature (ECT) 374 at engine start up. At very cold engine coolant temperatures below a low temperature set point, preferably 0 degrees Fahrenheit (−18° C.), the timer T1 is set to a high timer value, preferably 10 minutes, as shown by line 376. Between the low temperature set point and a high temperature set point, preferably 0 (−18° C.), and 15 degrees Fahrenheit (−9° C.) respectively, timer T1 setting changes as shown by line 377 as a variable timer value, preferably between 10 and 0 minutes. Intermediate points on the graph are preferably derived by interpolation. Above the high temperature set point, timer T1 is set to a low timer value, preferably 0 minutes as shown by line 378. Alternatively, more set points are used to define the relationship between timer T1 and the starting temperature.

FIG. 16 is a graph 380 showing a second timer setting 382 verses the starting temperature, in this case engine coolant temperature (ECT) 384 at engine start up. At very cold engine coolant temperatures in a low variable temperature range, preferably between −40 and 0 degrees Fahrenheit (−18° C. and −4° C.), timer T2 is set within a high variable time range as shown by line 386. The high variable time range is preferably between 45-30 minutes. When the temperature is in an intermediate temperature range, preferably between 0 and 20 degrees Fahrenheit (−18° C. and −9° C.), timer T2 is set to a variable amount as shown by line 387. Again, in an intermediate variable time range, preferably between 30 to 0 minutes, intermediate points on the graph are derived by interpolation. Above a high value temperature set point, preferably 20 degrees Fahrenheit (−7° C.), timer T2 is set to a low timer set point, preferably 0 degrees Fahrenheit (−18° C.) as shown by line 388. Alternatively, more set points are used to define the relationship between timer T2 setting and starting temperature.

Figure 17:
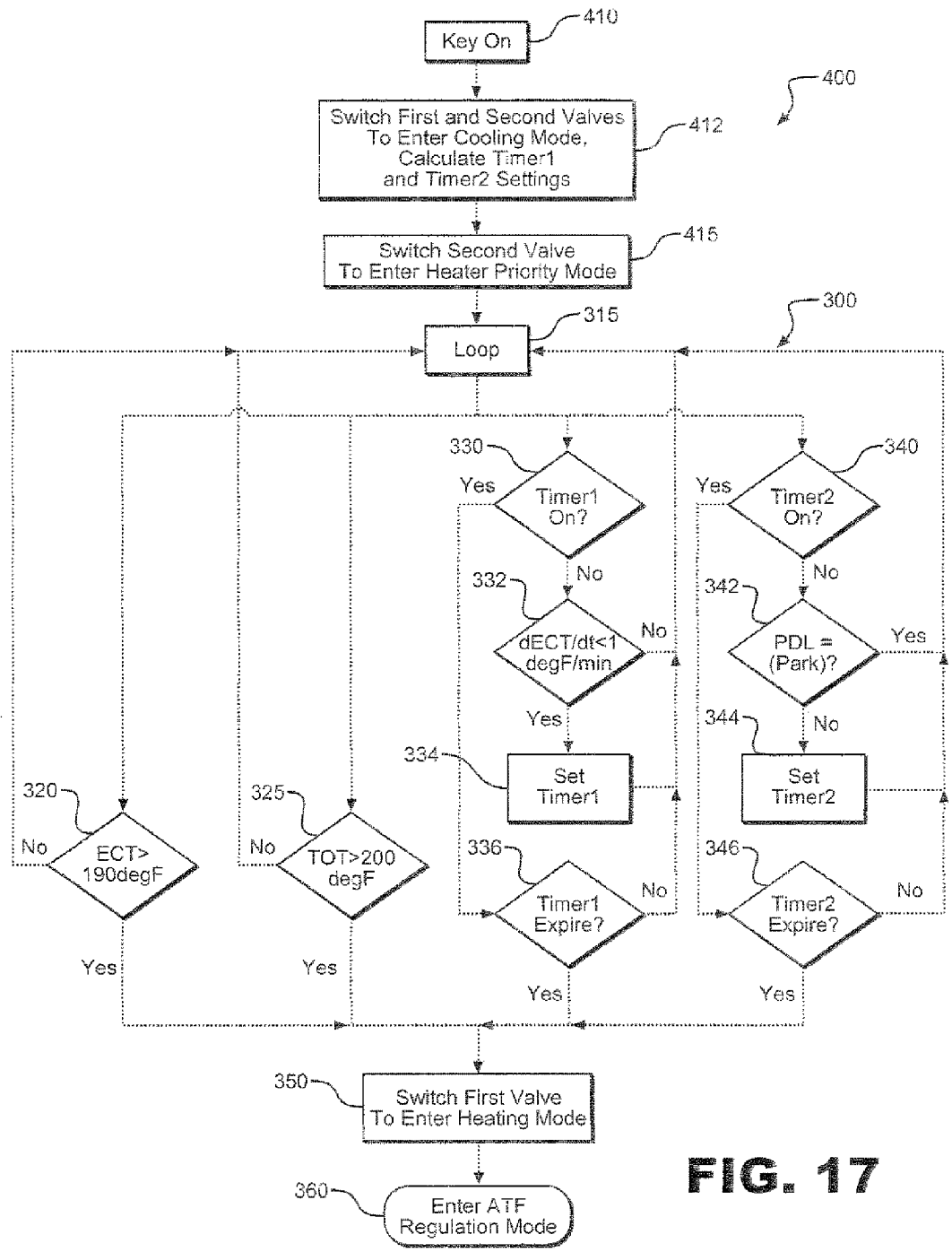
FIG. 17 is a flowchart showing a control routine employed according to the second, third and fourth preferred embodiments of the invention.

FIG. 17 is a flowchart showing a control routine 400 employed in systems 130, 230 and 330 according to the second, third and fourth preferred embodiments of the invention. Control routine 400 starts when a key is turned as in step 410 to start engine 12. At step 412, first valve 80, 280 and second valve 190, 290 are switched to the position shown in FIGS. 7, 10 and 13 so that systems 130, 230 and 330 enter the automatic transmission-cooling mode. Also, controller 35 calculates settings for first and second timers T1, T2 at step 412 based on one of the initial starting temperature of the engine coolant, ambient air or automatic transmission fluid. Preferably, less than two seconds later, control routine 400 then proceeds to step 415 and switches second valve 190, 290. At this point, systems 130, 230 and 330 are in the heater priority mode wherein no engine coolant flow is passing through heat exchanger 70. Control routine 400 then essentially incorporates all the steps of control routine 300 of FIG. 10 and therefore the description of routine 300 will not be repeated. Control routine 400 will then switch first valve 80, 280 if any one of the four conditions described above occur to enter the heating mode. Preferably, second valve 190, 290 will also switch.

Figure 18:
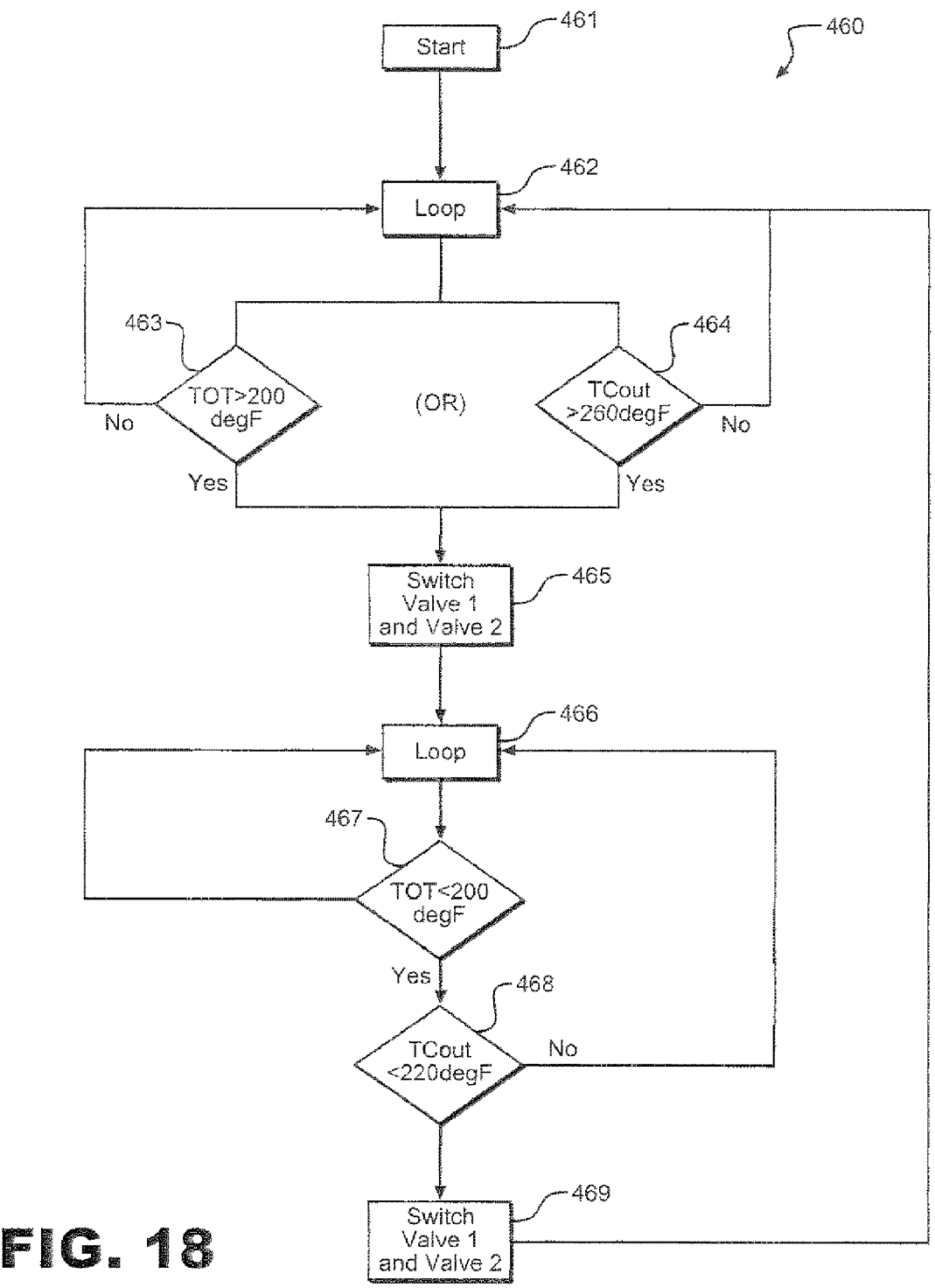
FIG. 18 is a flowchart showing details of the automatic fluid transmission temperature control routine of FIG. 13 that applies to all four preferred embodiments.

After control routine 300 has completed, control routine 400 enters automatic transmission fluid regulation mode at step 460 as can best be seen in FIG. 18. Systems 130, 230 and 330 are in automatic transmission warming mode when first entering step 461 and then the routine proceeds to loop 462. Preferably, systems 130, 230 and 330 switch to automatic transmission cooling mode if either of the following two conditions are met, i.e., sump temperature exceeds a set value, preferably 220 degrees Fahrenheit (104° C.) as seen at step 463, or transmission case output temperature exceeds a set value, preferably 260 degrees Fahrenheit (127° C.) as seen at step 464. Essentially, these conditions indicate that the automatic transmission fluid needs cooling, thus first and second valve are switched to enter the cooling mode as shown at step 465. Of course, it is possible that these conditions may not be met when transmission 18 is subject to a light duty cycle. Systems 130, 230 and 330 then switch back to automatic transmission heating mode as shown in steps 466, 467, 468 and 469 if both the following conditions are met, i.e., sump temperature drops below a set value (TOT), preferably 200 degrees Fahrenheit (93° C.) as shown in step 467, and transmission case out temperature drops below a set value, preferably 220 degrees Fahrenheit (104° C.) as shown in step 468. At step 469, systems 130, 230 and 330 then proceed to switch back and forth between the warming mode and the cooling mode based on the same criteria as shown by loops 462 and 466. While described with respect to systems 130, 230 and 330 of FIGS. 5-13, the automatic transmission temperature regulation is also employed by the first preferred embodiment by switching valve 80 between the warming mode of FIG. 3 to the cooling mode of FIG. 4 based on the temperature criteria described above.

Each of the four preferred embodiments provides a system for heating and cooling automatic transmission fluid in a rapid and efficient manner thereby reducing the transmission fluid's viscosity and cooling the transmission fluid when the transmission is subjected to heavy loads. Although described with reference to preferred embodiments of the invention, it should be readily understood that various changes and/or modifications can be made to the invention without departing from the spirit thereof. For example, the optional preheating supply line 78 shown in FIGS. 2-4 could be used in any of the embodiments shown in FIGS. 5-13. In general, the invention is only intended to be limited by the scope of the following claims.

The invention claimed is:

1. A vehicle comprising:
a passenger compartment;
an internal combustion engine; and
an automatic transmission using transmission fluid and transmitting power from the engine to drive wheels to propel the vehicle, and a system for heating and cooling the transmission fluid, said system including:
a heat exchanger fluidly connected to the engine and transmission, said heat exchanger being adapted to receive engine coolant from the engine, direct transmission fluid to the transmission and transfer heat between the engine coolant and the transmission fluid;
a passenger compartment heater core in fluid connection with both the engine and passenger compartment, said heater core being adapted to receive engine coolant from the engine, and to transfer heat between the engine coolant and air for the passenger compartment;
a radiator fluidly connected to the engine and the heat exchanger, said radiator being adapted to cool the engine coolant;
a first valve fluidly connected between the engine and the heat exchanger and being adapted to selectively allow or prevent the flow of engine coolant from the engine to the heat exchanger;
a second valve fluidly connected between the engine, the heat exchanger, and the radiator and being adapted to selectively allow fluid flow of engine coolant from the radiator to a select one of the engine and the heat exchanger; and
a controller for controlling the first and second valves to place the system into a select one of several modes including, a heating mode wherein hot engine coolant flows directly to the heat exchanger from the engine, and a cooling mode wherein cool engine coolant flows directly to the heat exchanger from the radiator and a heater core priority mode wherein no engine coolant flows to the heat exchanger, whereby transmission fluid temperature regulation occurs in an efficient manner with minimal impact on passenger compartment heating.

2. The vehicle of claim 1 wherein the system further includes a thermostat connected between the engine and the radiator and being adapted to selectively allow fluid flow of engine coolant from the engine to the radiator; and the several heating modes further includes a heater core priority mode wherein when the thermostat is closed no engine coolant flows to the heat exchanger.

3. The vehicle of claim 1 wherein the system further includes a second valve fluidly connected between the engine, the heat exchanger, and the radiator and being adapted to selectively allow fluid flow of engine coolant from the radiator to a select one of the engine and the first valve; the controller also controls the second valve; and the several heating modes further includes a heater core priority mode wherein no engine coolant flows to the heat exchanger.

4. The vehicle of claim 1 wherein the radiator includes a high temperature section and a low temperature section and the second valve is connected to the low temperature section.

5. The vehicle of claim 1 wherein the system further comprises a fluid channel between the radiator and the engine and a thermostat located in the channel.

6. The vehicle of claim 1 wherein the system further comprises a heater core fluid return channel extending between the heater core and the engine and a hot coolant return channel leading from the heat exchanger to the heater core fluid return channel.

7. The vehicle of claim 1 wherein the system further comprises a cool coolant supply channel extending between the radiator and the heat exchanger with the second valve being located in the cool coolant supply channel.

8. The vehicle of claim 1 wherein the system further comprises a heater core fluid channel extending between the engine and the heater core and a hot coolant supply channel leading from the heater core fluid channel to the first valve.

9. The vehicle of claim 8 wherein the system further comprises:
a cool coolant supply channel extending between the radiator and the first valve with the second valve being located in the cool coolant supply channel;
a shunt channel extending between the first valve and the heat exchanger.

10. The vehicle of claim 1 wherein the system further comprises a temperature sensor for sensing sump temperature, second and a temperature sensor for measuring engine coolant temperature.

11. The vehicle of claim 1 wherein the system further comprises a first timer for determining when to switch the first and second valves triggered based on a rate of change of temperature of the engine coolant and having a time value based on a measured starting temperature and a second timer for determining when to switch the first and second valves triggered based on movement of a transmission control switch and having a time value based on a function of the starting temperature.

12. A system for heating and cooling a transmission fluid for use in a vehicle with a passenger compartment, an internal combustion engine, an automatic transmission using the transmission fluid and transmitting power from the engine to drive wheels to propel the vehicle, said system comprising:
a heat exchanger fluidly connected to the engine and transmission, said heat exchanger being adapted to receive engine coolant from the engine, direct transmission fluid to the transmission and transfer heat between the engine coolant and the transmission fluid;
a passenger compartment heater core in fluid connection with both the engine and passenger compartment, said heater core being adapted to receive engine coolant from the engine, and to transfer heat between the engine coolant and air for the passenger compartment;
a radiator fluidly connected to the engine and the heat exchanger, said radiator being adapted to cool the engine coolant;
a first valve fluidly connected between the engine and the heat exchanger and being adapted to selectively allow or prevent the flow of engine coolant from the engine to the heat exchanger;
a second valve fluidly connected between the engine, the heat exchanger, and the radiator and being adapted to selectively allow fluid flow of engine coolant from the radiator to a select one of the engine and the heat exchanger; and a controller for controlling the first and second valves to place the system into a select one of several modes including, a heating mode wherein hot engine coolant flows directly to the heat exchanger from the engine, a cooling mode wherein cool engine coolant flows directly to the heat exchanger from the radiator and a heater core priority mode wherein no engine coolant flows to the heat exchanger, whereby transmission fluid temperature regulation occurs in an efficient manner with minimal impact on passenger compartment heating.

13. The system of claim 12 wherein the system further includes a thermostat connected between the engine and the radiator and being adapted to selectively allow fluid flow of engine coolant from the engine to the radiator; and the several heating modes further includes a heater core priority mode wherein when the thermostat is closed no engine coolant flows to the heat exchanger.

14. The system of claim 12 wherein the system further includes a second valve fluidly connected between the engine, the heat exchanger, and the radiator and being adapted to selectively allow fluid flow of engine coolant from the radiator to a select one of the engine and the first valve; the controller also controls the second valve; and the several heating modes further includes a heater core priority mode wherein no engine coolant flows to the heat exchanger.

15. The system of claim 12 wherein the system further comprises a heater core fluid return channel extending between the heater core and the engine and a hot coolant return channel leading from the heat exchanger to the heater core fluid return channel.

16. The system of claim 12 wherein the system further comprises a cool coolant supply channel extending between the radiator and the heat exchanger with the second valve being located in the cool coolant supply channel.

17. The system of claim 12 wherein the system further comprises a heater core fluid channel extending between the engine and the heater core and a hot coolant supply channel leading from the heater core fluid channel to the first valve.

18. The system of claim 17 wherein the system further comprises a cool coolant supply channel extending between the radiator and the first valve with the second valve being located in the cool coolant supply channel, a shunt channel extending between the first valve and the heat exchanger.

19. The system of claim 12 wherein the system further comprises a temperature sensor for sensing sump temperature, a temperature sensor for measuring engine coolant temperature.

20. The system of claim 12 wherein the system further comprises a first timer for determining when to switch the first and second valves triggered based on a rate of change of temperature of the engine coolant and having a time value based on a measured starting temperature and a second timer for determining when to switch the first and second valves triggered based on movement of a transmission control switch and having a time value based on a function of the starting temperature.

21. A system comprising:
a first valve fluidly connected between an engine and a heat exchanger for transferring heat between engine coolant and transmission fluid;

a second fluid valve connected between the engine, the heat exchanger and a radiator and being adapted to selectively allow fluid flow of the engine coolant from the radiator to a select one of the engine and the heat exchanger; and a controller for controlling the first and second valves to place the system into a select one of several modes including: a heating mode wherein hot engine coolant flows directly to the heat exchanger from the engine, a cooling mode wherein cool engine coolant flows directly to the heat exchanger from the radiator, and a heater core priority mode wherein no engine coolant flows through the heat exchanger.

22. The system of claim 21 further comprising a cool coolant supply channel extending between the radiator and the heat exchanger, with the second valve being located in the cool coolant supply channel.

23. The system of claim 21 further comprising:
a heater core fluid channel extending between the engine and the heater core; and
a hot coolant supply channel leading from the heater core fluid channel to the first valve.

24. The system of claim 23 further comprising a cool coolant supply channel extending between the radiator and the first valve, with the second valve being located in the cool coolant supply channel, a shunt channel extending between the first valve and the heat exchanger.

25. The system of claim 21 further comprising:
a first temperature sensor for sensing sump temperature; and
a second temperature sensor for measuring engine coolant temperature, each of the first and second temperature sensor being linked to the controller.

* * * * *